US012656784B2

(12) United States Patent
Pease et al.

(10) Patent No.: US 12,656,784 B2
(45) Date of Patent: *Jun. 16, 2026

(54) CLEARANCE ENVELOPE MANAGEMENT FOR REGULATING VEHICLE MOVEMENT

(71) Applicant: DISNEY ENTERPRISES, INC., Burbank, CA (US)

(72) Inventors: Bradley A. Pease, South El Monte, CA (US); Kevin T. Parent, Florence, MA (US); Frank D. Mezzatesta, III, Glendale, CA (US); Andrew Jesse Milluzzi, Clermont, CA (US); William Bennett Hogue, Jr., Simi Valley, CA (US); Allan Bloemsma, Glendale, CA (US); Youssef Safwat Rokes, Monterey Park, CA (US); Selina L. Herman, Burbank, CA (US); Bryant D. Boyle, Montverde, FL (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 18/760,229

(22) Filed: Jul. 1, 2024

(65) Prior Publication Data

US 2026/0003357 A1 Jan. 1, 2026

(51) Int. Cl.
*G05D 1/246* (2024.01)
*G05D 1/622* (2024.01)
*G05D 1/693* (2024.01)

(52) U.S. Cl.
CPC ............. *G05D 1/246* (2024.01); *G05D 1/622* (2024.01); *G05D 1/693* (2024.01)

(58) Field of Classification Search
CPC ......... G05D 1/246; G05D 1/622; G05D 1/693
See application file for complete search history.

(56) References Cited

U.S. PATENT DOCUMENTS

| | | | |
|---|---|---|---|
| 9,079,109 B2 | 7/2015 | Buhler | |
| 9,744,930 B2* | 8/2017 | Howard | B60R 21/02 |
| 10,215,858 B1 | 2/2019 | Klein et al. | |
| 11,762,390 B1* | 9/2023 | Alagic | G06F 18/211 |
| | | | 701/23 |
| 12,372,652 B2 | 7/2025 | Siemer et al. | |
| 12,442,896 B2 | 10/2025 | Buerkle et al. | |
| 2009/0272289 A1* | 11/2009 | Baker | A63G 7/00 |
| | | | 104/76 |
| 2012/0006221 A1* | 1/2012 | Crawford | A63G 31/02 |
| | | | 104/53 |

(Continued)

OTHER PUBLICATIONS

"U.S. Appl. No. 18/760,140, filed Jul. 1, 2024".

*Primary Examiner* — Hunter B Lonsberry
*Assistant Examiner* — Harrison Heflin
(74) *Attorney, Agent, or Firm* — Dorsey & Whitney LLP

(57) ABSTRACT

A method may include comparing, using a virtual map, a position of a ride vehicle to a position of an obstacle in an operating environment; and querying a virtual map of an operating environment, the virtual map including a characteristic for an object within the operating environment; and maintaining, by a ride vehicle, a clearance envelope with respect to the object based on the object characteristic. Additional methods and associated systems are also disclosed.

20 Claims, 8 Drawing Sheets

(56) References Cited

U.S. PATENT DOCUMENTS

| | | | |
|---|---|---|---|
| 2015/0055124 A1* | 2/2015 | Buhler ..................... | B61K 9/00 |
| | | | 356/72 |
| 2017/0144307 A1* | 5/2017 | Rublee .................... | B25J 19/02 |
| 2019/0187703 A1* | 6/2019 | Millard .................. | G05D 1/249 |
| 2022/0176995 A1* | 6/2022 | Subramanian ........ | B60W 30/08 |
| 2023/0406355 A1* | 12/2023 | Baba ................... | B60W 40/107 |
| 2024/0001962 A1* | 1/2024 | Horita ................... | B60W 40/06 |
| 2024/0134379 A1* | 4/2024 | Xin ........................ | G05D 1/242 |
| 2024/0231381 A1* | 7/2024 | Yamada ................. | G08G 1/166 |
| 2024/0310860 A1* | 9/2024 | Van De Velde ....... | G01C 21/20 |
| 2025/0196662 A1* | 6/2025 | Costa ....................... | B62M 6/45 |
| 2026/0003363 A1 | 1/2026 | Pease et al. | |

* cited by examiner

CLEARANCE ENVELOPE MANAGEMENT FOR REGULATING VEHICLE MOVEMENT

CROSS-REFERENCE TO RELATED APPLICATION

The present application is related to U.S. application Ser. No. 18/760,140, filed Jul. 1, 2024, and titled "VEHICLE MOVEMENT MANAGEMENT", the disclosure of which is incorporated by reference.

FIELD

The present application relates generally to regulating object movement and, more specifically, to systems and methods for managing protection envelope implementation in environments with moving vehicles and dynamically changing conditions.

BACKGROUND

Vehicles (e.g., Automated Guided Vehicles (AGVs) or Free Ranging Vehicles (FRVs)) operate in an environment (e.g., an attraction or ride, warehouse, factory and the like) that adheres to rider clearance envelopes (i.e., reach envelopes). Clearance envelopes define an area or volume that a rider is able to directly or indirectly contact from within a passenger location in the vehicle. Clearance envelopes are determined based on biophysical characteristics of riders, knowledge of objects that passengers may be carrying, as well as vehicle characteristics such as seating position, passenger restraints and the like. Clearance envelopes are also determined by environmental conditions in that a vehicle stays farther away from a hot object than it would to a cool object. Vehicle motion characteristics such as speed, inertia and turning can also be used to determine the size and shape of a clearance envelope (e.g., a faster moving vehicle may warrant a larger clearance envelope than a would a slower moving vehicle). Using the clearance envelope, vehicle motions are controlled such that a vehicle's clearance envelope will not intersect with an object, environmental feature, or surface (collectively "environmental conditions" in a way that would allow a passenger to undesirably come into direct or indirect contact with the environmental condition.

The processes and control systems to put clearance envelopes into practice can be very difficult to implement. For example, previous solutions leaned on manual procedural enforcement where teams create paths through facilities for AGVs and compare the paths using modeling software (e.g., AutoCAD drawing) or hand measurements in the facility to make sure the AGVs do not violate standoff or setback distances required by worst case conditions defined in standards. Such processes are time consuming and dependent on personnel to carry out. Further, particularly in entertainment contexts, clearance envelope management may require time-consuming iteration between technical/engineering personnel and creative personnel during AGV path development.

Moreover, any preset, static clearance envelope determinations limit travel path variations that AGVs are intended to create. A desirable feature of AGV in an entertainment attraction, however, is that the travel path can be varied either programmatically or by user interaction such that traditional clearance envelopes defined by worst case scenarios can be unnecessarily constraining. For example, in the case of a vehicle passing a door, the clearance envelope may be relatively large when the door is open, but could be much smaller when the door is closed thereby shielding the vehicle from environmental conditions behind the door. Static planning based on worst case scenario would use a reach envelope that assumed the door is always open, thus limiting vehicle movement unnecessarily when the door is closed. In addition, static clearance envelope determinations are unable to respond to transient environmental conditions and instead rely on the AGVs following very specific pre-determined paths through a facility.

BRIEF SUMMARY

A method of assigning clearance envelopes within an operating environment is disclosed herein. In embodiments, the method includes receiving, by an on-vehicle processor, and from a virtual map of an operating environment, data associated with the operating environment of the vehicle. In embodiments, the method includes determining, by the on-vehicle processor, a zone classification at a particular location of the operating environment based on the data from the virtual map. In embodiments, the method includes assigning, by the on-vehicle processor, a clearance envelope to the vehicle based on the zone classification while the vehicle operates in the particular location.

Optionally, the method can be performed while the vehicle is moving in an operating environment.

Optionally, the method can include a process of updating the virtual map while operating the vehicle so that the virtual map represents current environmental conditions and the clearance envelope can be determined by the vehicle based on current conditions.

Optionally, the on-vehicle processor can query an off-vehicle system continuously, periodically, or at intervals to obtain updated data from the virtual map.

A method of managing a vehicle in and environment is disclosed herein. In embodiments, the method includes querying, by the vehicle, a virtual map of an operating environment, the virtual map including a characteristic for an object within the operating environment. In embodiments, the method includes maintaining, by the vehicle, a clearance envelope with respect to the object based on the characteristic for the object.

Optionally, the method includes receiving, by the vehicle, an updated characteristic for the object. In embodiments, the method includes adjusting, by the vehicle, the clearance envelope based on the updated characteristic for the object.

Optionally, the clearance envelope is dynamically adjusted by the vehicle based on a characteristic of the vehicle. In embodiments, the characteristic of the vehicle includes at least one of a speed, an orientation, or a configuration of the vehicle.

Optionally, the clearance envelope is a reach envelope.

Optionally, the characteristic for the object comprises a surface characteristic for the object.

Optionally, the vehicle is a ground vehicle.

A system disclosed herein includes a vehicle and a processor configured to perform operations. In embodiments, the operations include querying a virtual map of an operating environment for the vehicle, the virtual map comprising a characteristic for an object within the operating environment, and determining a clearance envelope with respect to the object based on the characteristic of the object.

Optionally, the virtual map is provided by a source off the vehicle, and the vehicle includes the processor such that the determining is performed on the vehicle. The clearance envelope may be determined based on a location and speed of the vehicle.

Optionally, the operations include receiving an updated characteristic for the object, and adjusting the clearance envelope based on the updated characteristic for the object.

Optionally, the clearance envelope is a vehicle protection envelope.

Optionally, the characteristic for the object includes a surface characteristic for the object.

Optionally, the vehicle is configured to be ridden by a rider.

A non-transitory computer storage media storing computer-usable instructions is disclosed herein. When executed by a computing device, the instructions cause the computing device to perform operations, including querying a virtual map of an operating environment for a vehicle, the virtual map including a characteristic for an object within the operating environment, and determining a clearance envelope with respect to the object based on the characteristic for the object.

Optionally, the operations include receiving an updated characteristic for the object, and adjusting the clearance envelope based on the updated characteristic for the object.

Optionally, the computing device is, or is on, a vehicle. The clearance envelope may be dynamically adjusted while the vehicle is in operation and based on at least one of a speed, an orientation, or a configuration of the vehicle.

Optionally, the clearance envelope is a rider reach envelope or a vehicle protection envelope.

Optionally, the characteristic for the object includes a surface characteristic for the object

DETAILED DESCRIPTION

Figure 1:
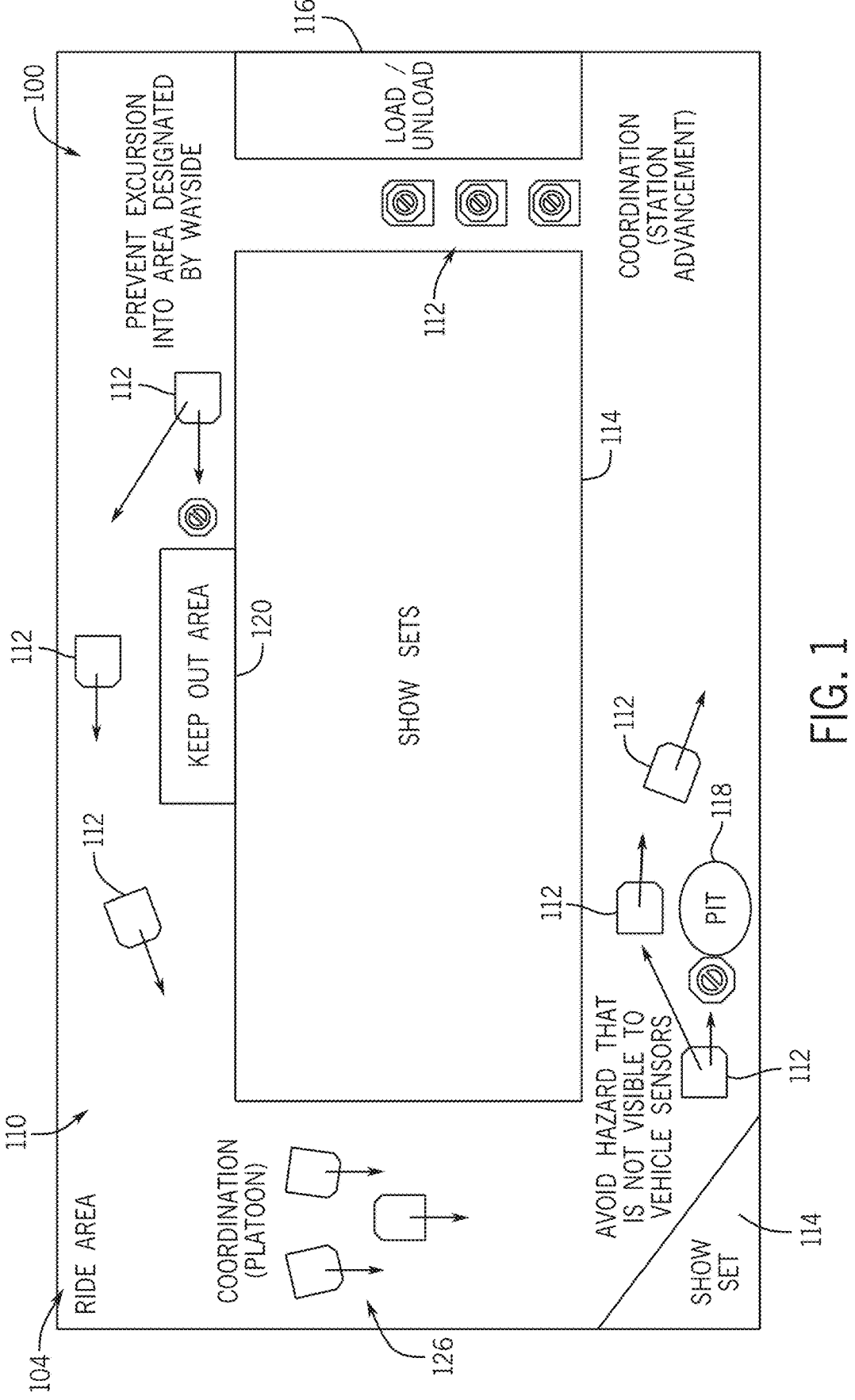
FIG. 1 illustrates an example virtual map for use in map-based vehicle movement management.

The present disclosure leverages a dynamic and continuously updated virtual map to control operation of one or more vehicles, including AGVs, FRVs, ride vehicles, and other vehicles. For example, a vehicle may know its position in an environment and update its location on the virtual map. The vehicle may compare its position to those of known obstacles on the virtual map. In some embodiments, the vehicle may compare its position to other vehicles or environmental elements on the virtual map. Vehicle travel trajectories (e.g., current and expected motion) may be evaluated to determine if the trajectories need to change to avoid obstacles on the virtual map. Depending on the application, the virtual map may be centralized (e.g., wayside) or decentralized (e.g., on each vehicle) or a combination of both. In addition, or alternatively, the vehicle itself may do the comparison, or a central wayside computer may do the comparison and send vehicle commands based on the comparison.

As a result, embodiments of the present disclosure may avoid interference with obstacles that are not visible to a vehicle, but their positions are known and represented by the virtual map. Additionally, or alternatively, embodiments of the present disclosure may provide coordination between vehicles by a centralized wayside computer (e.g., platoon synchronization and individual vehicle movement), coordination between vehicles and other elements by a centralized wayside computer, and/or traffic and fleet management (e.g., starting and stopping of vehicles, priority of movement, etc.). For example, map-based vehicle movement management may provide a more thrilling attraction, such as vehicles being able to get closer to each other and to objects and surfaces in the operating environment, among other new or unique effects. Additionally, or alternatively, map-based vehicle movement management may provide two-dimensional (2D) or three-dimensional (3D) vehicle safety protection and/or improved uptime as issues can be identified on the map and vehicles can avoid undesired areas. Additionally, or alternatively, vehicle protection may be simplified, and the need for pre-analysis of travel paths may be minimized.

In some embodiments, the present disclosure may be implemented with "smart" vehicles that able to sense their operating environment (e.g., using sensors such as LiDAR and Radar). These sensors in conjunction with a representation of an operating space (i.e., a virtual map) allow the vehicle to distinguish between objects that are represented in the virtual map, and objects that are not (i.e., unexpected objects). Once encountered and classified, unexpected objects may be added to the virtual map for use by other vehicles and objects. Unexpected objects may be assessed through an object recognition algorithm to determine if the unexpected objects are another vehicle operating in nearby proximity or another known object. As unexpected objects are identified, the vehicle can assign protections to the object or vehicle based on the observed dynamics of the vehicle and a clearance envelope shape associated with the type of identified object.

In this manner, the vehicle may assume responsibility for maintaining minimum distance requirements. In addition, the vehicle may make decisions in real time or near real time regarding the need for minimum spacing from other vehicles or objects. Such embodiments may also reduce the minimum distance needed by the vehicle (e.g., decrease the amount of protection needed by the vehicle compared to other "smart" solutions) because the vehicle will know how to assign both vehicle and guest/rider reach protections. Such embodiments may also allow for quick changes of vehicle motion and effectively remove the need for a virtual track and pre-analysis. By reducing the need of pre-analysis and other computational tasks, the techniques described herein may allow for faster processing and/or realize additional benefits, such as improved efficiencies in vehicle and guest/rider protection envelope assessments using existing vehicles.

Embodiments of the present disclosure may define the operating environment of an AGV using a static or dynamic virtual map that the vehicle may continuously query to understand how to interact with its surroundings. Such embodiments may allow the vehicle to programmatically enforce clearance envelope rules based on the boundary condition details represented in the virtual map. For example, embodiments disclosed herein may minimize the need for verifying reach envelope compliance with a vehicle and physical envelope (e.g. physically pulling a vehicle through a space). In this manner, teams may need to only verify that definitions of the virtual map are accurate, leaning on the intelligence of the vehicle to make sure that standoff distances are maintained based on the virtual map definitions. Such embodiments may support quicker path and profile implementation in a given facility or ride environment as the vehicles protect themselves appropriately without the need for procedural checks.

Area/Map Based Management

FIG. 1 illustrates an example virtual map 100 for use in map-based management. A virtual map refers to a data structure that contains information about objects and their locations within a physical environment, but may not be represented in a conventional cartographic product or rendered so as to be viewable by persons. Hence FIG. 2 actually shows a rendered or "real" human readable map that represents a virtual map 100 which may exist only as a data structure. The virtual map 100 (or map) may represent an operating environment 104, such as an attraction, a ride environment, or the like. The virtual map 100 may include data associated with one or more structures, vehicles, surfaces, boundaries, objects, or the like in the operating environment 104. This data includes, for example, attributes or conditions such as location, boundaries, shape, orientation, flexibility, speed, temperature, object type, or any of a near limitless variety of attributes or conditions that might be useful in a particular operating environment 104. For example, the virtual map 100 may identify (e.g., digitally) one or more obstacles 110 and one or more vehicles 112 in the operating environment 104 or area. As shown, the virtual map 100 may represent or otherwise identify the position of each vehicle 112 relative to the obstacles 110 in the operating environment 104. This information may be used to manage vehicle movement, such as operation of the vehicle(s) 112 within the operating environment 104. While the present disclosure focuses on entertainment environments and managing ride vehicles, it should be appreciated that the present disclosure is applicable to a wide variety of environments with moving vehicles, such as warehouses, assembly lines, parking lots, city streets and highways to name examples. Depending on the application, the virtual map 100 may be stored on a vehicle 112 (e.g., each vehicle 112) or external to the vehicle 112, such as on a centralized wayside computer (or combinations thereof).

The obstacles 110 may be any structure, surface, boundary, hazard, undetectable/negative space, or object within the operating environment 104. For example, the obstacles 110 may include show sets 114, a loading/unloading area 116, a pathway obstruction or danger 118, or a restricted area 120. The show sets 114 may be fixed or movable pieces of the attraction for viewing by a rider of a vehicle 112, such as screens, props, doors, animatronics, or stages, among other attraction elements. The loading/unloading area 116 may be an area of the operating environment 104 where riders may load into, or unload from, a vehicle 112. The pathway obstruction/danger 118 may be a surface imperfection (e.g., a crack or pit in the floor, a slippery surface, etc.), a broken vehicle, a fallen show piece, dropped personal belongings, or other objects within the operating environment 104, such as along an intended path of the vehicle 112 through the attraction. The restricted area 120 may be any area within the operating environment 104 in which positioning of a vehicle 112 is undesired. For example, the restricted area 120 may be a hazardous area, a construction zone, or an area within which undesired viewing of the show sets 114 may occur.

Such examples are illustrative only, and the obstacles 110 may include other objects or configurations. For example, at least one obstacle 110 may be another vehicle 112. In some embodiments, at least one obstacle 110 may be undetectable to the vehicle 112. In such embodiments, the presence of the obstacle 110 may be known to the vehicle 112 only by the virtual map 100. In this manner, a user may identify an area within the operating environment 104 that is otherwise undetectable (e.g., a restricted area 120 that is not set off with cones or markers, an undetectable surface imperfection, a show set 114 masked by fog or mist, etc.) of which the vehicle 112 will treat as an obstacle 110.

The vehicles 112 may be configured to move through the operating environment 104 as part of an attraction or ride. "Ride vehicle" as used herein may refer to a vehicle coupled to a track, a trackless vehicle, an AGV, or an FRV, without intent to limit. In embodiments, the vehicle 112 is a pilotless vehicle, such as a ground vehicle, an aerial vehicle, or other mobile platform. Depending on the application, the vehicle 112 may by piloted autonomously (e.g., via an onboard controller or a centralized controller, such as the centralized wayside computer) or manually via remote control. The vehicle 112 may be a people mover or a ride/attraction element (e.g., a show element) configured to move through the operating environment 104, although other configurations are contemplated. The vehicle 112 may be ridden by one or more riders, personnel, staff, etc., or the vehicle 112 may move through the operating environment 104 without riders (e.g., as part of an attraction or show element). In other embodiments, a vehicle may be an automated warehouse vehicle, automated trainyard vehicle, tow vehicles, automated delivery vehicle, aerial vehicle, suspended vehicle, submarine, boat, watercraft, and the like. As a result, the term "vehicle" is not characterized by any particular function, shape, type, or technology.

In embodiments, the vehicles 112 may all be similar to one another, or the vehicles 112 may include different configurations. For example, one vehicle 112 may be configured to move people through the attraction, whereas another vehicle 112 may be configured to move as part of the attraction itself (e.g., as part of a show set 114, to provide visual interest, etc.). Additionally, or alternatively, one vehicle 112 may be a ground vehicle, whereas another vehicle 112 may be an aerial vehicle or a boat, i.e., the term vehicle 112 is meant to encompass vehicles of all types and in different environments.

As shown, the vehicles 112 may move individually and/or as a group through the operating environment 104. For example, the vehicles 112 may travel individually along a first portion of the attraction, such as along the same or similar path. In some embodiments, multiple vehicles 112 can act as a group. For example, the vehicles 112 may group together along a second portion of the attraction, such is in a platoon 126. In such embodiments, the platoon 126 may move in coordination along at least a portion of the attraction, with the platooned vehicles 112 moving together but along individual (e.g., different) paths. In another example, a plurality of vehicles 112 may be grouped together to move along the loading/unloading area 116 in coordination, such as simultaneously or synchronously along the same path as a group.

Using the virtual map 100, the vehicles 112 may move through the operating environment 104 while avoiding the obstacles 110. For example, identification of the obstacles 110 in the virtual map 100 may define the path or trajectory of the vehicles 112 through the attraction. In embodiments, the virtual map 100 may be dynamic and continually updated (e.g., during attraction operation). For example, the number and position of obstacles 110 and vehicles 112 may be continually updated in the virtual map 100, whether by the vehicle 112, a centralized wayside computer, a program user, or the like. As a result, one or more travel paths may be updated accordingly, such as automatically. As a result, the need for pre-analysis of travel paths may be minimized, thereby increasing efficiency and reducing downtime caused by unforeseen circumstances.

Management of vehicle movement through the operating environment 104 may be accomplished in various ways. In embodiments, a position of a vehicle 112 may be compared to a position of an obstacle 110 in the operating environment 104 using the virtual map 100. Depending on the application, the vehicle 112 itself or a centralized processor may do the comparing. In embodiments, the position of the vehicle 112 may be known, such as by the vehicle 112 or a centralized processor, or the position may be determined. For example, an environmental feature of the operating environment 104 may be detected by the vehicle 112. In such embodiments, the position of the vehicle 112 may be determined based on the detected environmental feature. The environmental feature may be a known hazard, object, or structure within the operating environment 104, such as a fixed feature of, or a known marker in, the operating environment 104 that is detectable by the vehicle 112. In embodiments, the virtual map 100 may be validated or updated based on the detected environmental feature. For example, presence of the detected environmental feature in the virtual map 100 may validate the virtual map 100, although other configurations are contemplated.

Object Recognition

Figure 2:
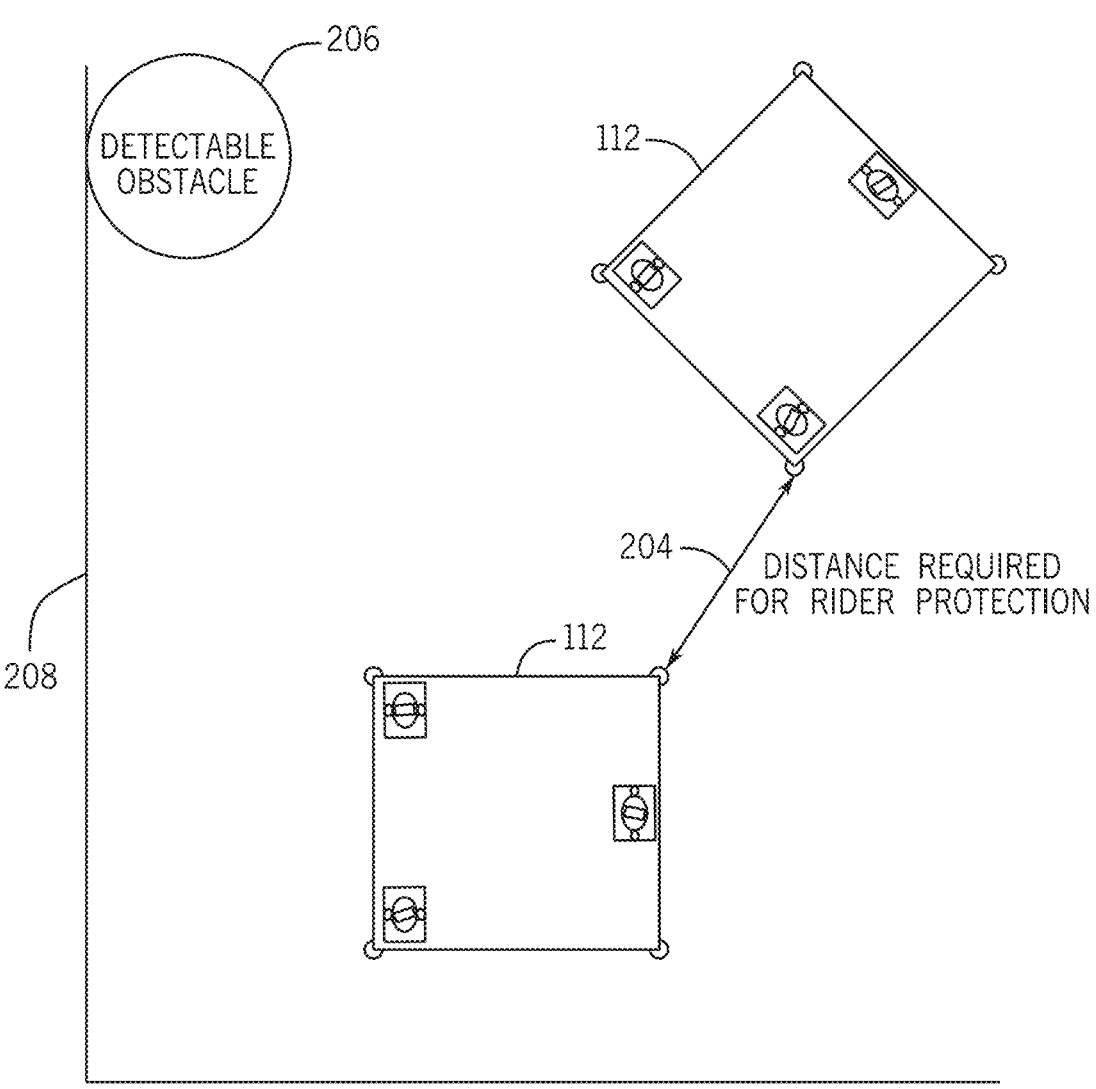
FIG. 2 illustrates a schematic view of example minimum separation distances for a vehicle.

FIG. 2 illustrates a schematic view of an example minimum separation distance 204 for a vehicle 112. Vehicles 112 operating in close proximity may require a minimum amount of separation, such as to ensure rider and equipment protection. The minimum separation distance 204 may also apply while operating in close proximity to an object 206 (e.g., any one of the obstacles 110 discussed above) or one or more walls 208. The minimum separation distance 204 may be a function of one or more characteristics or factors, such as vehicle type, rider type, and attraction dynamics, among other things. For example, the minimum separation distance 204 may increase with increased vehicle speeds, increased rider reach capability (e.g., adult vs. child), or open cockpit configurations, among other factors. Conversely, the minimum separation distance 204 may decrease with decreased vehicle speeds, decreased rider reach capability (e.g., child vs. adult), or closed cockpit configurations, among other factors.

Figure 3:
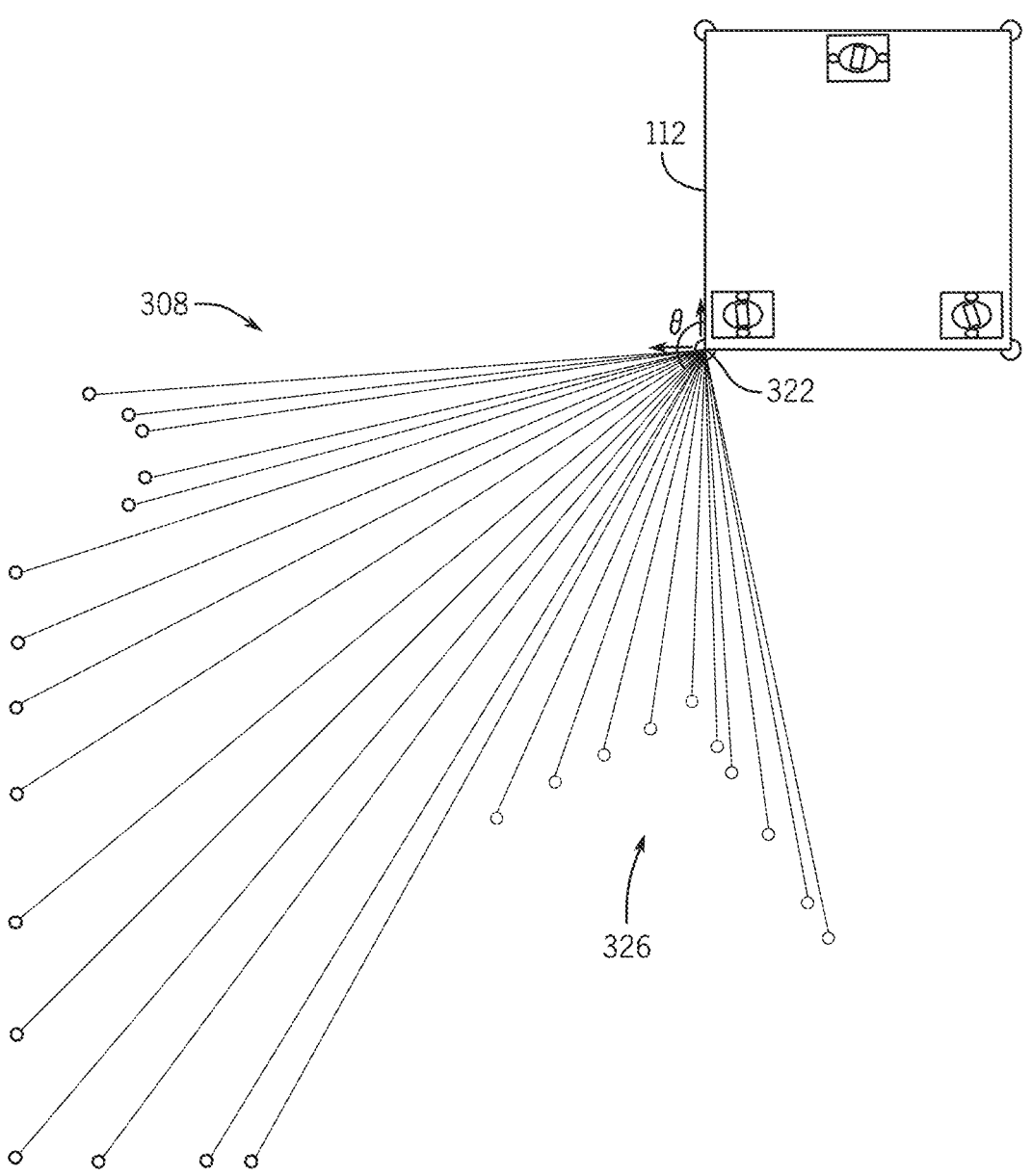
FIG. 3 illustrates an example point cloud used to detect one or more objects near a vehicle.

FIG. 3 illustrates an alternative implementation in which vehicle 112 is equipped with object detection hardware and software. Other implementations in accordance with this disclosure do not require on-vehicle object detection technology in that a virtual map 100 may include sufficient data to enable the vehicle 112 to determine environmental characteristics and object locations. In the example of FIG. 3, point cloud 308 used to detect one or more objects near a vehicle 112. In embodiments, one or more sensors 322 may perform a scan of the operating environment 104, such as to generate the point cloud 308 illustrated in FIG. 3. The point cloud 308 is a discrete set of data points in space, with each data point representing a single spatial measurement on a detected object surface (e.g., walls, elements, obstacles, other vehicles, etc.). Taken together, the point cloud 308 represents the detected operating environment 104 of the vehicle 112. As shown, the point cloud 308 may be a segment point cloud of a limited space around the vehicle 112 (e.g., of a particular quadrant or segment around the vehicle 112, etc.), although other configurations are contemplated.

Figure 4:
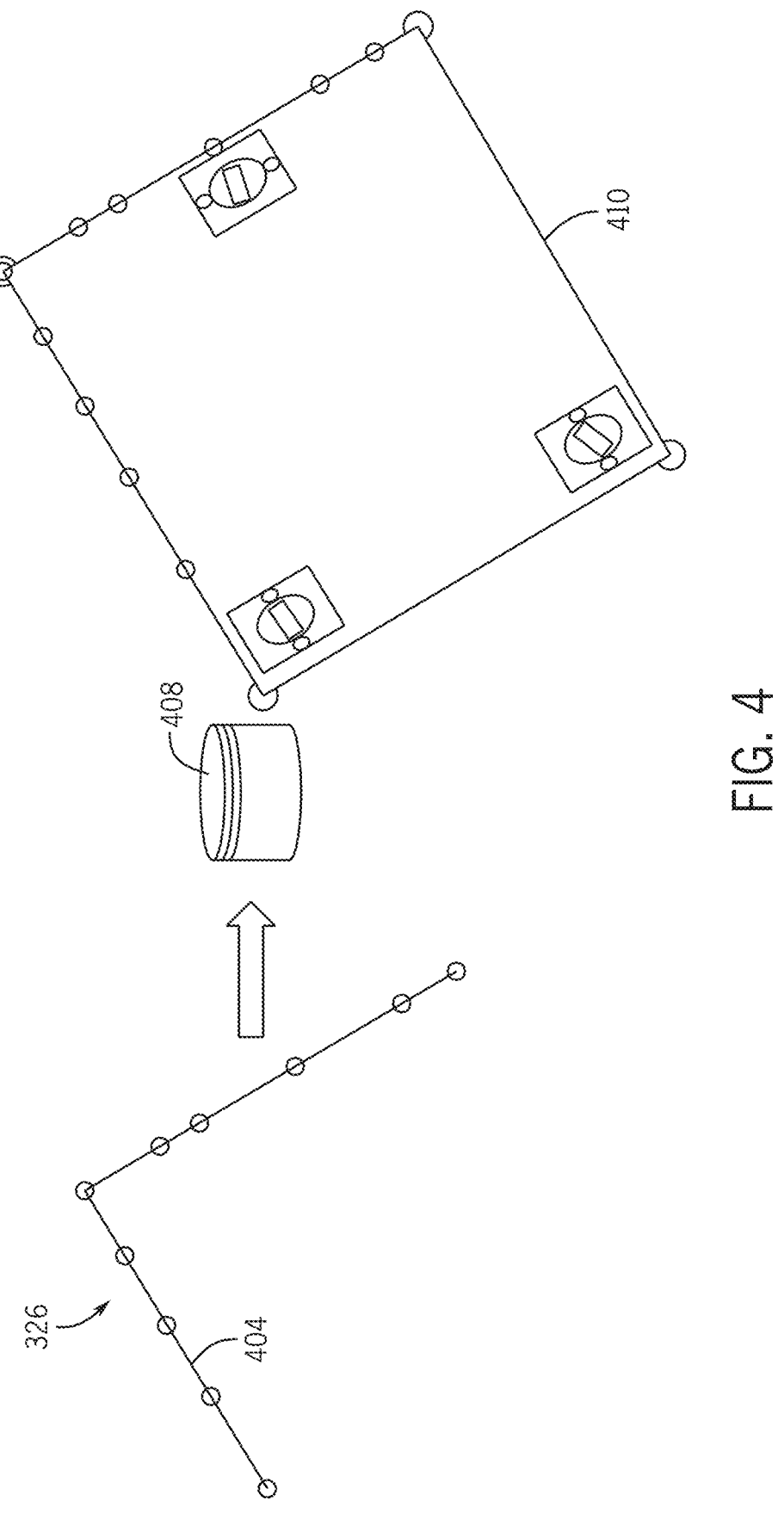
FIG. 4 illustrates an example object recognition algorithm to identify an object using the point cloud of FIG. 3.

FIG. 4 illustrates an example object recognition algorithm to identify an object in the operating environment 104 based on the point cloud 308. The features shown in FIG. 4 correspond to alternative implementations that use a smart vehicle with onboard capability to detect objects in the environment as discussed in reference to FIG. 3. Other implementations in accordance with this disclosure do not require on-vehicle object detection technology in that a virtual map 100 may include sufficient data to enable the vehicle 112 to determine environmental characteristics and object locations. As shown in FIG. 4, at least some of the second set of points 326 may be converted to a shape 404. For example, the second set of points 326 may be connected by one or more lines to define the shape 404, such as the L-shape as illustrated in FIG. 4. Such examples are illustrative only, and additional or different shapes may be identified by the second set of points 326. In embodiments, the shape 404 may be analyzed based on an object database 408 to associate the shape 404 with an expected object 410. For example, the shape 404 may be analyzed by or otherwise ran through the object database 408 to determine whether the shape 404 can be associated with an expected object 410 (e.g., such as via a best fit algorithm, classification algorithm, or the like).

Figure 5:
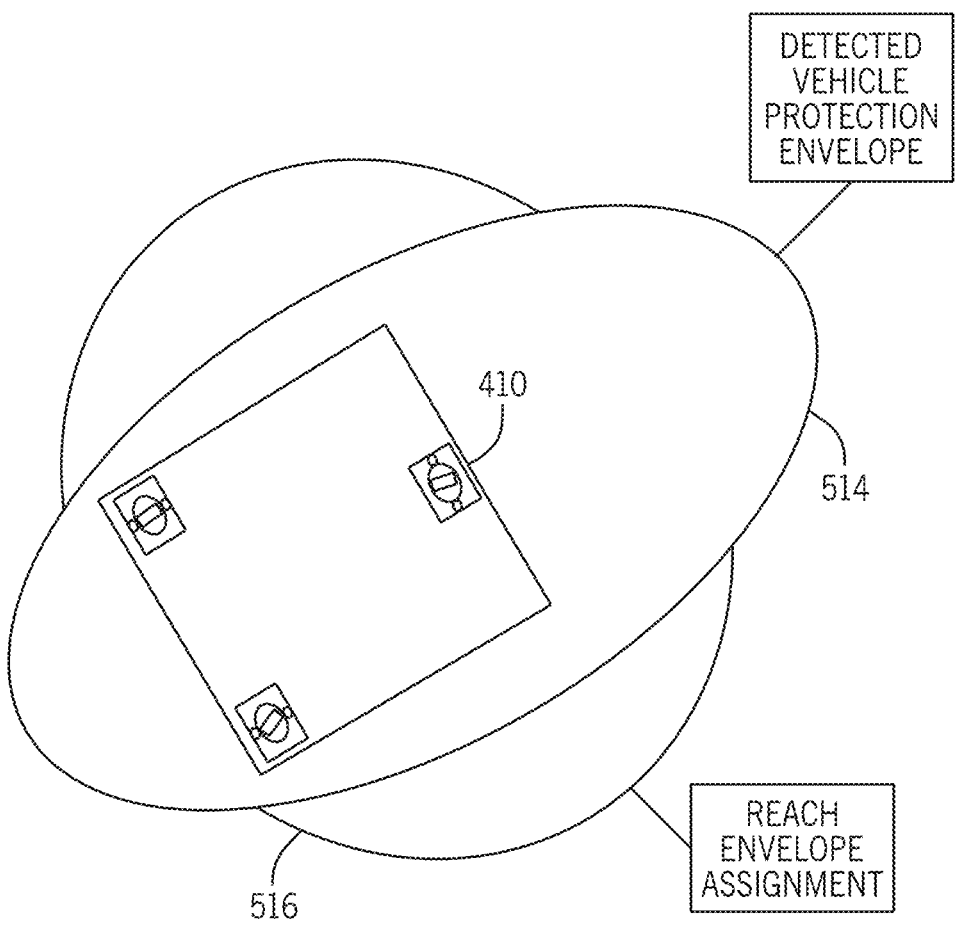
FIG. 5 illustrates example clearance envelopes.

FIG. 5 illustrates example clearance envelopes assigned to a vehicle 112 based on a particular object (e.g., an object 410) represented on virtual map 100. Based on data about the object 410 retrieved from virtual map 100, one or more clearance envelopes may be assigned to the object 410. For example, at least one of a vehicle protection envelope 514 or a rider reach envelope 516 may be assigned to the identified object 410, such as when the identified object 410 is a vehicle. In such embodiments, the vehicle 112 may maintain minimum distance requirements to the identified object, such as by not piercing the vehicle protection envelope 514 or the rider reach envelope 516.

The vehicle protection envelope 514 may be a protection based on observed and/or anticipated dynamics of the identified vehicle. For example, the vehicle protection envelope 514 may be shaped and adjusted based on the observed or anticipated speed, acceleration limits, and/or trajectory of the identified vehicle. In some embodiments, the vehicle protection envelope 514 may be shaped and adjusted based on vehicle and/or environmental anomalies or events, such as planned and unplanned scenarios and/or conditions. As shown, the vehicle protection envelope 514 may have an oblong shape with an area of protection that is greatest in the direction of travel of the identified vehicle. In embodiments, the vehicle protection envelope 514 may be based on stored characteristics or profiles of the identified vehicle that are analyzed to generate the output.

The rider reach envelope 516 may be a protection associated with the type of identified vehicle. For example, an open cockpit configuration may result in a larger rider reach envelope 516 as riders can reach out of the vehicle. Similarly, a closed cockpit configuration may result in a smaller or non-existent rider reach envelope 516 since riders cannot reach out of the vehicle.

Reach Envelope Protection

Figure 6:
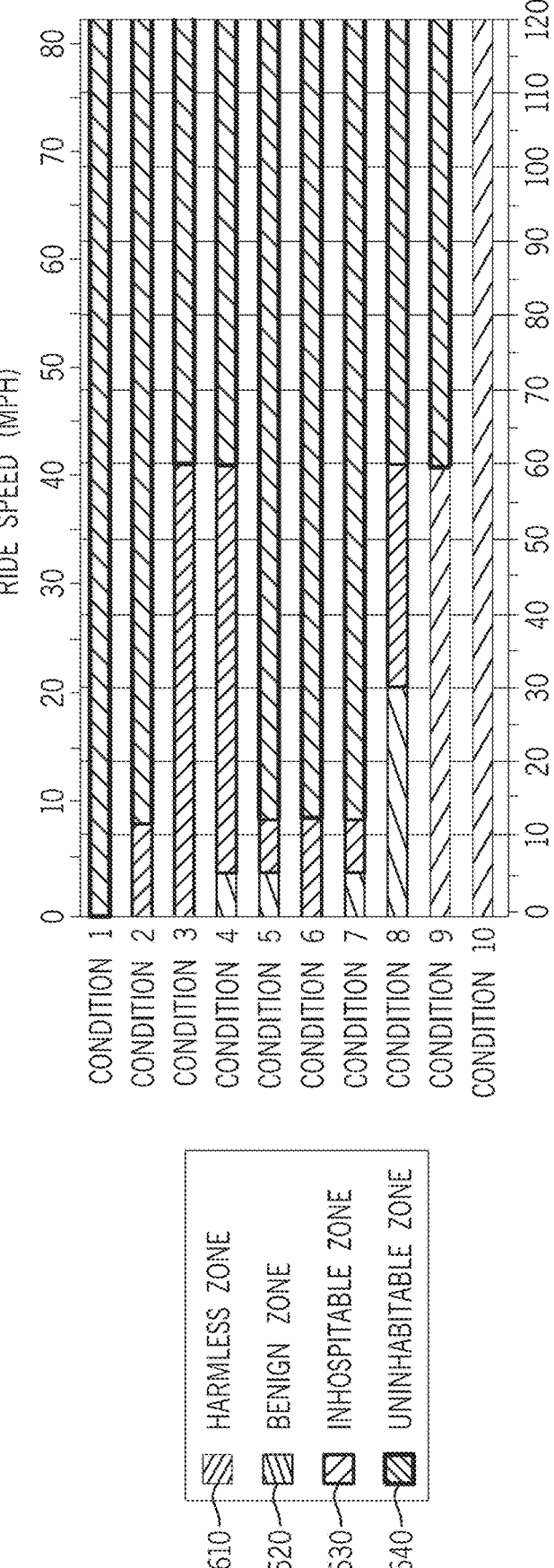
FIG. 6 is a chart illustrating clearance requirements for conditions based on vehicle speed.

FIG. 6 illustrates example clearance requirements for spatial zones within an operating environment based on one vehicle behavior characteristic (e.g. vehicle speed) and several environmental and/or object conditions (e.g., wet, slippery, hot, and the like). Other vehicle behavior requirements that may be defined in a similar way include direction, lane changing, ability to stop, rate of speed change, entrance permission, and the like. Operation or positioning of a vehicle 112 in an attraction may be constrained or otherwise determined based on one or multiple conditions present in the operating environment 104. For example, minimum clearances from the vehicle 112 to environmental conditions or objects may be set by one or more standards. In embodiments, the minimum clearances may also vary based on vehicle speed. For example, lower vehicle speeds may allow the vehicle 112 to be positioned closer to an environmental condition or object. Conversely, higher speeds may necessitate positioning of the vehicle 112 further from the environmental conditions or objects.

In embodiments described herein, operation or positioning of a vehicle 112 may be constrained or controlled by on-board vehicle systems, wayside systems, or both working cooperatively. Constraint and control actions are determined by the on-board and/or wayside systems consulting the virtual map 100 which represents, among other information, protection envelopes around vehicles and objects represented on virtual map 100. The size and shape of clearance envelopes 100 may be determined entirely from information on virtual map 100, or, alternatively, may be determined in conjunction with sensors and systems on-board vehicles 112 which augment information on the virtual map 100 as discussed in reference to FIG. 3 and FIG. 4.

FIG. 6 illustrates example clearance standards, represented by clearance zones 610, 620, 630 and 640, for various environmental conditions or objects based on vehicle speed. Example environmental conditions or objects (e.g., "Condition 1," "Condition 2," etc. illustrated in FIG. 6) may include hot or sharp objects, animation, doors and handrails, grabbable objects, walls, precipitation, mist, or gas, among others. In embodiments, ranges of vehicle speeds may correspond to a particular clearance zone with respect to the environmental conditions or objects proximate to the vehicle's location. For example, a first range of vehicle speeds may correspond to a harmless zone 610 with respect to some environmental conditions or objects. Similarly, a second range of vehicle speeds may correspond to a benign zone 620, a third range of vehicle speeds may correspond to an inhospitable zone 630, and a fourth range of vehicle speeds may correspond to an uninhabitable zone 640 with respect to particular environmental conditions or objects. Such clearance zones are exemplary, and other clearance zones may be defined, as well as the ranges of each zone adjusted based as appropriate for a particular application.

The harmless zone 610 may represent a spatial zone in which the vehicle 112 is free to operate adjacent or near the environmental condition or object. For example, referring to FIG. 6, the vehicle 112 may operate in "Condition 10" at any vehicle speed with minimal clearance envelope protections. Conversely, the uninhabitable zone 640 may represent a spatial zone corresponding to a large clearance envelope that prevents operation adjacent or near the environmental condition or object. For example, the vehicle 112 may be prohibited from operating "Condition 1" regardless of speed. Both the benign zone 620 and the inhospitable zone 630 may correspond to clearance envelopes of various size and shape in which the vehicle 112 is able to operate at certain speed ranges, with more caution given in the inhospitable zone 630. For example, some caution may be needed in the benign zone 620, with greater caution needed in the inhospitable zone 630, such as in "Condition 8."

As shown, increasing vehicle speeds may elevate the clearance envelope requirements needed to operate the vehicle 112 with respect to an environmental condition or object. For example, with respect to "Condition 8," speeds up to 30 feet per second (fps) may correspond to the benign zone 620, speeds from 30 fps to 60 fps may correspond to the inhospitable zone 630, and speeds greater than 60 fps may constitute the uninhabitable zone 640 of operation. The change in operation zones may occur at different speeds and/or at different elevations of caution. For example, with respect to "Condition 9," speeds up to a threshold (e.g., 60 fps for "Condition 9") may correspond to the harmless zone 610, and speeds greater than the threshold may correspond to the uninhabitable zone 640 of operation, with no other zones between the harmless zone 610 and the uninhabitable zone 640.

Figure 7:
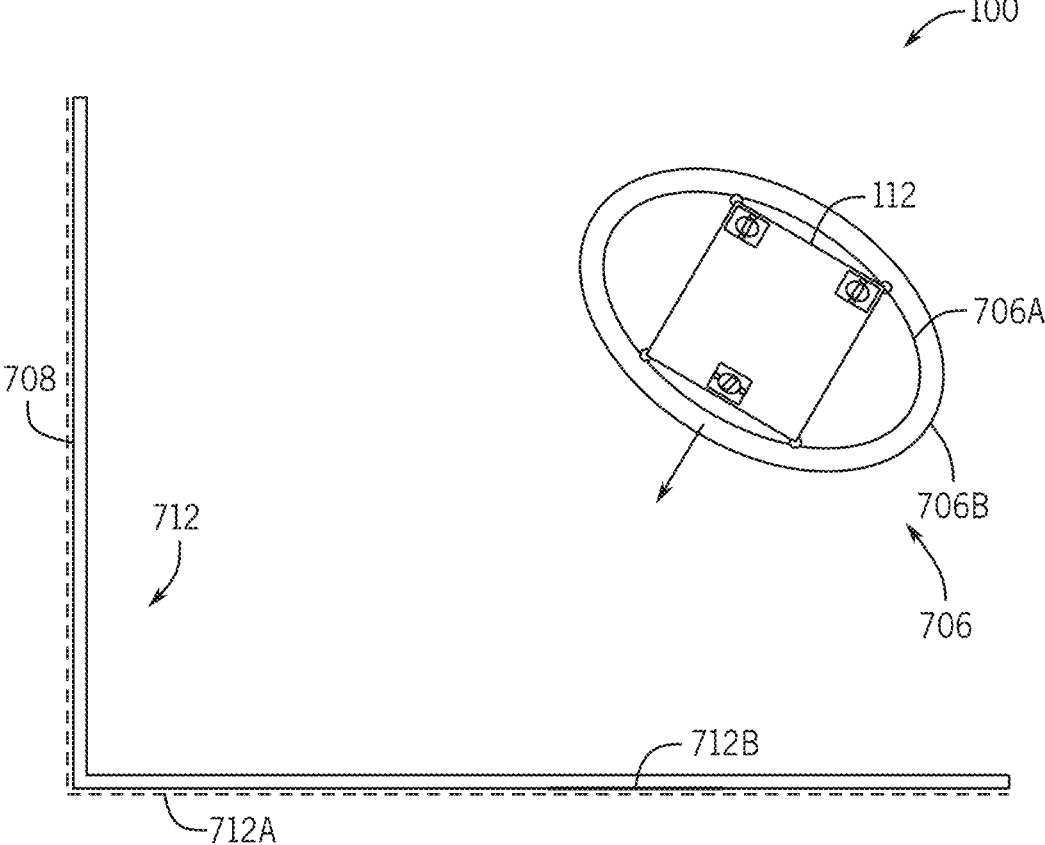
FIG. 7 illustrates an example virtual map for use in defining a clearance envelope for a vehicle.

FIG. 7 illustrates use of the virtual map 100 in defining a clearance envelope 706 (e.g., the rider reach envelope 516) for vehicle 112. Specifically, FIG. 7 is a partial view of the virtual map 100 illustrating locations of the vehicle 112 and an object 708 in the operating environment 104. Here, the object 708 is a wall or surface (e.g., of a show set 114, of the loading/unloading area 116, a boundary, etc.); however, the object 708 may be any obstacle 110 or obstacle in the operating environment 104.

The virtual map 100 may include or define a characteristic 712 for the object 708. For example, the virtual map 100 may include a first characteristic 712A for the object 708. The first characteristic 712A may define a first condition (e.g., a first environmental condition such as conditions 1-10 shown in FIG. 6) for the object 708. An example first characteristic 712A may include a surface characteristic for the object 708, such as a "smooth wall" condition, a "show flat that is smooth" condition, or any other surface condition, such as those listed in FIG. 6, for instance.

As discussed above with reference to FIG. 6, the first characteristic 712A may be used in combination with a vehicle behavior characteristic (e.g., speed) to determine or define a the size and shape of a first clearance envelope 706A of the vehicle 112 with respect to the object 708. For example, based on vehicle speed and the first characteristic 712A, a processor (e.g., onboard logic or a centralized wayside computer) may determine a first clearance envelope 706A needed, such as to prevent or limit contact with the object 708, for instance.

In embodiments, the virtual map 100 may also include or define a second characteristic 712B for the object 708. The second characteristic 712B may be used in combination with a vehicle behavior characteristic to determine or define the size and shape of a second clearance envelope 706B for the vehicle 112 with respect to object 708. An example second characteristic 712B may include an additional surface characteristic for the object 708, such as an "animation" condition or any other surface condition, such as those listed in FIG. 6, for instance.

The second characteristic 712B may determine or define a second set of operation parameters of the vehicle 112 with respect to the object 708. For example, based on vehicle speed and the second characteristic 712B, a processor (e.g., onboard logic or a centralized wayside computer) may determine a second clearance envelope 706B needed, such as to prevent or limit contact with the object 708, for instance. In embodiments, the second characteristic 712B may necessitate a different treatment from the perspective of the vehicle 112 compared to the first characteristic 712A. For example, the second characteristic 712B may necessitate a greater clearance envelope 706B compared to those associated with the first characteristic 712A, or vice versa.

The vehicle 112 may query the virtual map 100, such as continuously, periodically, or as needed during operation. Querying the virtual map 100 may allow the vehicle 112 to understand its environment and how the vehicle needs to interact with its surroundings. For example, based on the characteristic(s) 112 for the object 708, the vehicle 112 may maintain the clearance envelope 706 with respect to the object 708. As a result, the vehicle 112 may programmatically enforce clearance rules based on boundary condition details in the virtual map 100.

As noted above, the virtual map 100 may be updated, such as dynamically during operation. In such embodiments, the vehicle 112 may receive an updated characteristic for the object 708. For example, any one of the first characteristic 712A or the second characteristic 712B may be updated based on changing conditions. In such embodiments, the vehicle 112 may adjust the clearance envelope 706 based on the updated characteristic for the object 708.

In like manner, the clearance envelope 706 may be dynamically adjusted (e.g., by the vehicle 112) based on a characteristic of the vehicle 112 itself. In embodiments, the clearance envelope 706 may be adjusted based on a speed, an orientation, or a configuration of the vehicle 112. For example, increasing speeds may necessitate a larger clearance envelope 706, or vice versa. Similarly, an orientation of the vehicle 112 away from the object 708 may allow the clearance envelope 706 to reduce in size. As noted above, a closed cockpit configuration of the vehicle 112 may result in a smaller or non-existent clearance envelope 706 since riders cannot reach out of the vehicle 112, whereas an open cockpit configuration may result in a larger clearance envelope 706 as riders can reach out of the vehicle.

By setting or dynamically updating the clearance envelope 706 of the vehicle 112 using the virtual map 100, the need for verifying envelope compliance may be minimized. For example, an operator or user may need to only verify that the definitions of the virtual map 100 are accurate for the operating environment 104, leaning on the intelligence of the vehicle 112 itself to make sure that standoff distances are maintained. Such embodiments may support rapid path and profile changes in a given attraction as the vehicle 112 will protect itself (e.g., automatically) based on the definitions in the virtual map 100.

Any of the features, components, and/or parts, including the arrangements and configurations thereof shown in FIG. 7 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 7.

Figure 8:
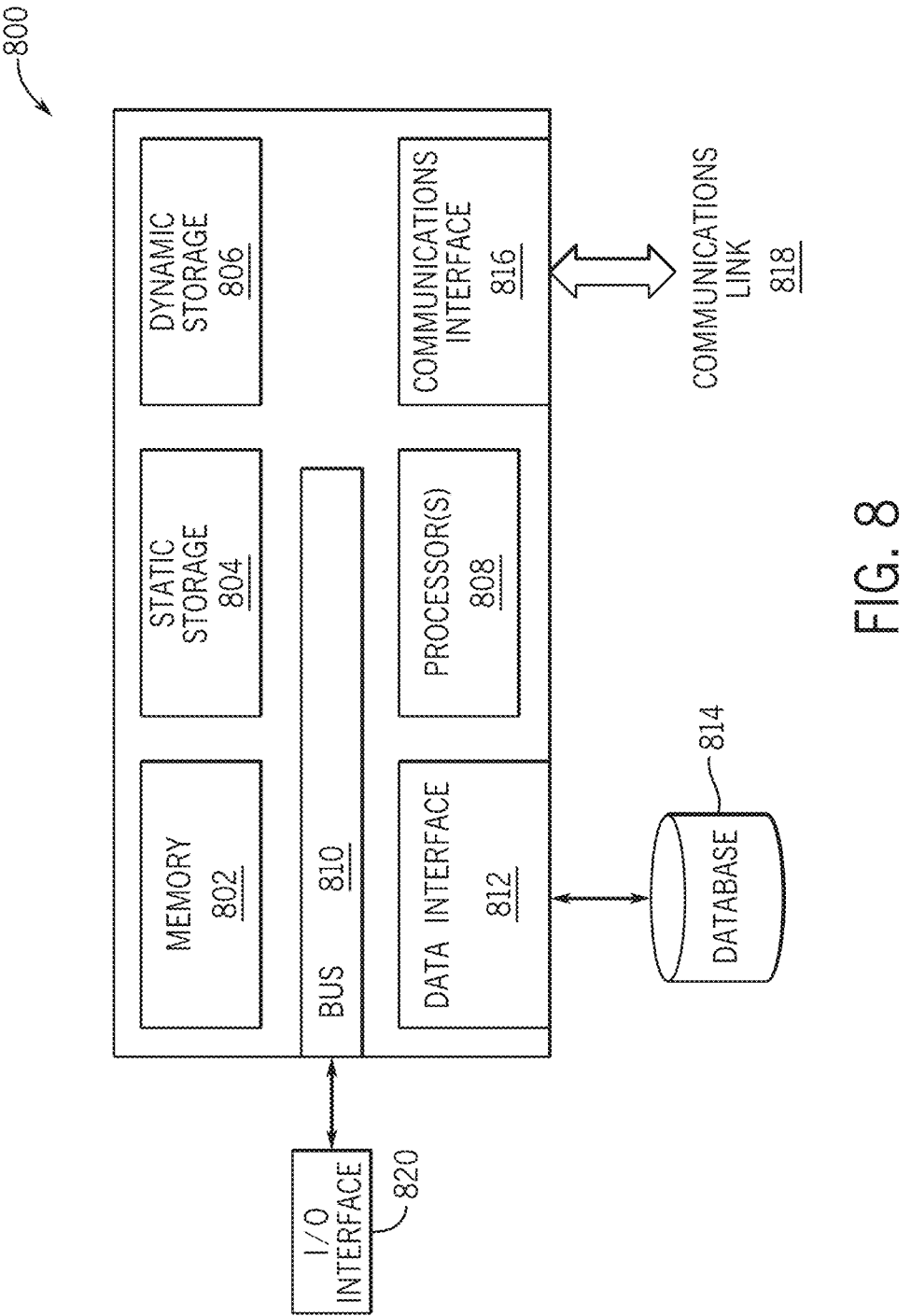
FIG. 8 illustrates an example computing system for implementing various examples of the present disclosure.

FIG. 8 illustrates an example computing system 800 for implementing various examples of the present disclosure. For example, in various embodiments, components of the vehicle 100 or other systems described herein may be implemented by one or several computing systems 800. In embodiments, the computing system 800 may be a centralized wayside computer in communication with the vehicle 112, such as to implement the systems and methods described herein. This disclosure contemplates any suitable number of computing systems 800. For example, the computing system 800 may be a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 800 may include one or more computing systems; be unitary or distributed; span multiple locations; span multiple machines; span multiple data centers; or reside in a cloud, which may include one or more cloud components in one or more networks.

As shown, the computing system 800 includes memory 802 (e.g., RAM), static storage 804 (e.g., ROM), dynamic storage 806 (e.g., magnetic or optical), a processor 808, a data interface 812, a communications interface 816 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), an input/output (I/O) interface 820 (e.g., keyboard, keypad, mouse, microphone, display enabling communication between a user and the computing system 800), and a bus 810 (e.g., an address/data bus or other communication mechanism for communicating information and/or interconnecting subsystems and devices of the computing system 800), or any combination thereof. In embodiments, the computing system 800 may include one or more of any such components.

In embodiments, processor 808 includes one or more processing units for executing instructions, such as those making up a computer program. For example, the processor 808 may execute instructions for various components of the vehicle 112 or other systems described herein. Although described in the singular for convenience, the processor 808 may include multiple processors (e.g., distributed over a network, between various components of the vehicle 112, etc.). The processor 808 includes circuitry for performing various processing functions, such as executing specific software to perform the methods of managing an attraction or vehicle described herein. For example, the processor may compare a position of the vehicle 112 to a position of an obstacle 110 in the operating environment 104 using the virtual map 100, and instruct a trajectory of the vehicle 112 to avoid the obstacle 110, such as in a manner as described above. In embodiments, the processor may receive an updated position of the vehicle 112 in the operating environment 104, and update the position of the vehicle 112 on the virtual map 100, such as in a manner as described above. Relatedly, in embodiments, the processor may receive data associated with a detected environmental feature of the operating environment 104, and determine the position of the vehicle 112 based on the received data, such as in a manner as described above. In embodiments, the processor may coordinate movement of the vehicle 112 with movement of another vehicle through the operating environment 104, such as in a manner as described above. In embodiments, the processor may receive data associated with an additional obstacle 110 identified by the vehicle 112, and update the virtual map 100 with the additional obstacle 110, such as in a manner as described above.

In particular embodiments, the communications interface 816 includes hardware, software, or both providing one or more interfaces for communication (such as, for example, packet-based communication) between computing system 800 and one or more other computer systems or one or more networks. One or more memory buses (which may each include an address bus and a data bus) may couple processor 808 to memory 802. Bus 810 may include one or more memory buses, as described below. In particular embodiments, one or more memory management units (MMUs) reside between processor 808 and memory 802 and facilitate accesses to memory 802 requested by processor 808. In particular embodiments, bus 810 includes hardware, software, or both coupling components of computing system 800 to each other.

According to particular embodiments, computing system 800 performs specific operations by processor 808 executing one or more sequences of one or more instructions contained in memory 802. For example, instructions for the vehicle 100 or other systems described herein may be contained in memory 802 and may be executed by the processor 808. Such instructions may be read into memory 802 from another computer readable/usable medium, such as static storage 804 or dynamic storage 806. In alternative embodiments, hard-wired circuitry may be used in place of or in combination with software instructions. Thus, particular embodiments are not limited to any specific combination of hardware circuitry and/or software.

In embodiments, the term "logic" means any combination of software or hardware that is used to implement all or part of particular embodiments disclosed herein. The term "computer readable medium" or "computer usable medium" may refer to any medium that participates in providing instructions to processor 808 for execution. Such a medium may take many forms, including but not limited to, nonvolatile media and volatile media. Non-volatile media includes, for example, optical or magnetic disks, such as static storage 804 or dynamic storage 806. Volatile media includes dynamic memory, such as memory 802.

Computing system 800 may transmit and receive messages, data, and instructions, including program, e.g., application code, through communications link 818 and communications interface 816. Received program code may be executed by processor 808 as it is received, and/or stored in static storage 804 or dynamic storage 806, or other storage for later execution. A database 814 may be used to store data accessible by the computing system 800 by way of data interface 812. In various examples, communications link 818 may communicate with the motion system 100 or other systems described herein.

Any of the features, components, and/or parts, including the arrangements and configurations thereof shown in FIG. 8 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 8.

The embodiments illustrated in FIGS. 1-5 are non-limiting examples for managing an attraction or a vehicle. Thus, the description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more." Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A method of managing a clearance envelope of a vehicle, the method comprising:

querying, by a vehicle, a virtual map of an operating environment, the virtual map including a characteristic for an object within the operating environment;

determining, by the vehicle, a clearance envelope with respect to the object based on the characteristic for the object; and adjusting an operation of the vehicle based on the clearance envelope, wherein the clearance envelope is a rider reach envelope.

2. The method of claim 1, further comprising:

receiving, by the vehicle, an updated characteristic for the object; and adjusting, by the vehicle, the clearance envelope based on the updated characteristic for the object.

3. The method of claim 1, further comprising dynamically adjusting, by the vehicle, the clearance envelope based on a characteristic of the vehicle.

4. The method of claim 3, wherein the characteristic of the vehicle comprises a cockpit configuration of the vehicle.

5. The method of claim 3, wherein the characteristic of the vehicle comprises at least one of a speed, an orientation, or a configuration of the vehicle.

6. The method of claim 1, wherein the characteristic for the object comprises a surface characteristic for the object.

7. The method of claim 1, wherein the vehicle is a ground vehicle.

8. The method of claim 1, wherein the determining the clearance envelope comprises determining a size of the rider reach envelope based on a reach capability of a rider.

9. The method of claim 1, wherein the object is a second vehicle.

10. A system comprising:

a vehicle;

a processor configured to perform operations comprising:

querying a virtual map of an operating environment for the vehicle, the virtual map comprising a characteristic for an object within the operating environment;

determining a clearance envelope with respect to the object based on the characteristic of the object; and adjusting an operation of the vehicle based on the clearance envelope, wherein the clearance envelope is a rider reach envelope.

11. The system of claim 10, wherein the virtual map is provided by a source off the vehicle, and wherein the vehicle comprises the processor so that the determining is performed on the vehicle.

12. The system of claim 10, wherein the clearance envelope is determined based on a location and speed of the vehicle.

13. The system of claim 10, wherein the operations further comprise:

receiving an updated characteristic for the object; and adjusting the clearance envelope based on the updated characteristic for the object.

14. The system of claim 10, wherein the characteristic for the object comprises a surface characteristic for the object.

15. The system of claim 10, wherein the vehicle is configured to be ridden by a rider.

16. A non-transitory computer storage media storing computer-usable instructions that, when executed by a computing device, causes the computing device to perform operations, the operations comprising:

querying a virtual map of an operating environment for a vehicle, the virtual map including a characteristic for an object within the operating environment;

determining a clearance envelope with respect to the object based on the characteristic for the object; and adjusting an operation of the vehicle based on the clearance envelope, wherein the clearance envelope is a rider reach envelope.

17. The non-transitory computer storage media of claim 16, wherein the operations further comprise:

receiving an updated characteristic for the object; and adjusting the clearance envelope based on the updated characteristic for the object.

18. The non-transitory computer storage media of claim 16, wherein the vehicle comprises the computing device.

19. The non-transitory computer storage media of claim 16, wherein the operations further comprise dynamically adjusting the clearance envelope while the vehicle is in operation and based on at least one of a speed, an orientation, or a configuration of the vehicle.

20. The non-transitory computer storage media of claim 16, wherein the characteristic for the object comprises a surface characteristic for the object.

* * * * *